United States Patent
Richards

(10) Patent No.: US 10,338,410 B1
(45) Date of Patent: Jul. 2, 2019

(54) EYEGLASS PRESCRIPTION CORRECTION FOR OPTICS BLOCKS IN HEAD-MOUNTED DISPLAYS

(71) Applicant: Facebook Technologies, LLC, Menlo Park, CA (US)

(72) Inventor: Evan M. Richards, Santa Clara, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 320 days.

(21) Appl. No.: 14/980,801

(22) Filed: Dec. 28, 2015

(51) Int. Cl.
*G02C 7/08* (2006.01)
*G02C 11/00* (2006.01)

(52) U.S. Cl.
CPC ............. *G02C 7/081* (2013.01); *G02C 11/10* (2013.01)

(58) Field of Classification Search
CPC ........ G02C 7/081; G02C 11/10; G02B 27/01; G02B 27/0101; G02B 27/0103; G02B 27/0149; G02B 27/017; G02B 27/0172; G02B 27/0176; G02B 27/0179; G02B 27/0189; G02B 2027/0174; G02B 2027/0178

USPC .......................................... 351/158; 345/7–9
See application file for complete search history.

(56) References Cited

U.S. PATENT DOCUMENTS

| | | | | |
|---|---|---|---|---|
| 2012/0127062 A1* | 5/2012 | Bar-Zeev | ................ | G02B 3/14 345/6 |
| 2013/0215147 A1* | 8/2013 | Hilkes | ................ | G02B 27/017 345/633 |
| 2016/0216515 A1* | 7/2016 | Bouchier | ............ | G03H 1/0808 |

* cited by examiner

*Primary Examiner* — Ricky L Mack
*Assistant Examiner* — Gary W O'Neill
(74) *Attorney, Agent, or Firm* — Fenwick & West LLP

(57) ABSTRACT

A method for modifying focal length of lenses of a HMD in accordance with a user's eyeglass prescription data and without the user having access to the eyeglass prescription data is disclosed. The method includes receiving an identifier that uniquely represents the user viewing content on the HMD. The method also includes obtaining eyeglass prescription data corresponding to the unique identifier that includes data for correcting eye defects of the user. The data is then applied by modifying optical properties such as focal length of the lenses to provide corrected vision to the user while the user views content on the HMD without the user having to wear prescription eyeglasses or contact lenses.

19 Claims, 5 Drawing Sheets

EYEGLASS PRESCRIPTION CORRECTION FOR OPTICS BLOCKS IN HEAD-MOUNTED DISPLAYS

BACKGROUND

The present disclosure generally relates to optics blocks in head-mounted displays (HMDs), and specifically to modifying the optics blocks to account for eyeglass prescription correction for users using the HMDs.

HMDs may be used to present augmented and/or virtual information to a user. For example, a virtual reality (VR) headset can be used to simulate virtual environments. HMDs use optics blocks to pass light originating from its display panel(s) to an exit pupil where the user's eyes are positioned. The user may have eye defects such as myopia (nearsightedness) or hyperopia (farsightedness) that may be corrected using prescription eyeglasses or contact lenses. Users with eye defects when viewing content on HMDs conventionally wear their prescription eyeglasses (or contact lenses), which is inconvenient and may reduce the user experience.

SUMMARY

A method for modifying optical properties such as focal length of lenses of a HMD in accordance with a user's eyeglass prescription data and without the user having access to the eyeglass prescription data is disclosed. The method may be implemented using either a hardware token correction or a cloud-based correction. The hardware token correction includes the usage of hardware such as a Universal Serial Bus (USB) dongle, radio frequency identification (RFID) tag, or a near field communication device (e.g., smartphone) in which an ophthalmologist or optometrist stores the eyeglass prescription data. The stored eyeglass prescription data is encrypted (e.g., using a token) in a manner that prevents the user or any third party from tampering with the prescription data. The USB dongle may then be directly plugged into the host system or the HMD such that the host or the HMD can obtain the eyeglass prescription data and modify the lenses accordingly.

The cloud-based correction includes storing the eyeglass prescription data on a server over a data communication network (e.g., cloud-based sever). The eyeglass prescription data is transferred from the office of the ophthalmologist or optometrist to the cloud-based server using an identifier that uniquely identifies the user (e.g., a number that links to the user's cloud profile). When the HMD is ready to be used by the user, the HMD or the host checks to see whether there is an eyeglass prescription for the user (using the unique identifier), downloads such eyeglass prescription data, and applies it to modify the lenses accordingly.

The eyeglass prescription data may include optical properties of the lens, such as a power of the lenses that represents an amount of correction needed to correct the user's eye defects. For example, the eyeglass prescription data may be represented in diopters (e.g., +1 D or –0.5 D) or as a change in focal length (e.g., 5 mm change for a lens with nominal focal length of 50 mm) of the lenses. If the eyeglass prescription data represents that the focal length of the lens is to be reduced by 5 mm from say 50 mm to 45 mm, the host applies the eyeglass prescription correction and modifies the focal length of the lens from 50 mm to 45 mm. The lenses of the HMD may be a tunable lens, such as one implemented using a pressurized liquid between two membranes or a liquid crystal lens such their focal length may be varied by changing the pressure of liquid between the membranes using an external input.

Performing eyeglass prescription correction for optics blocks in HMDs increases user convenience without reducing user experience by eliminating the need for the user to wear prescription eyeglasses (or contact lenses) while viewing content on HMDs. Additionally, modifying the HMD lenses without the user having access to the eyeglass prescription data enhances security of personal data such as eyeglass prescription data.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Eyeglass Prescription Correction System

Figure 1:
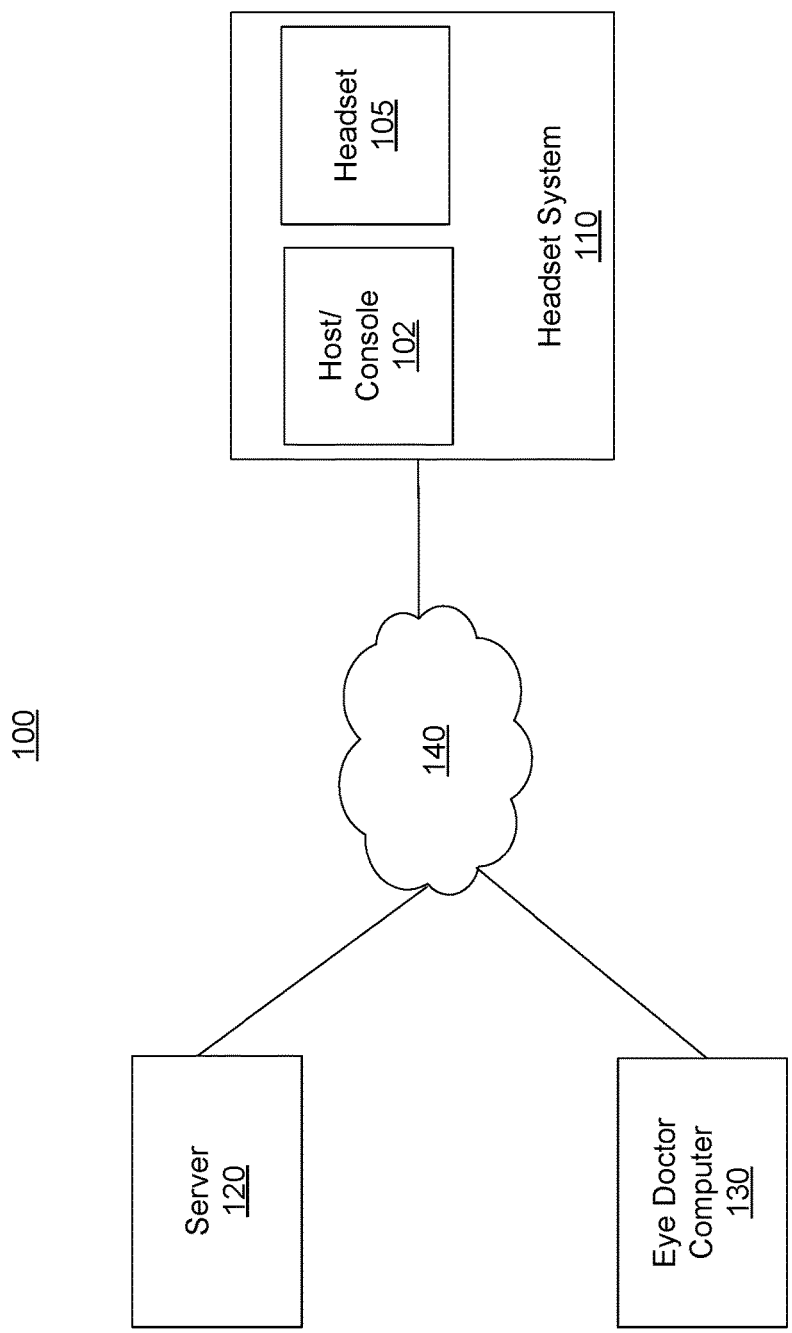
FIG. 1 shows a block diagram of a system for eyeglass prescription correction of optics blocks in HMDs, in accordance with an embodiment.

FIG. 1 shows a block diagram of a system 100 for eyeglass prescription correction of optics blocks in HMDs, in accordance with an embodiment. The system 100 includes, among other components, a headset system 110, a server 120, an eye doctor computer 130, and a network 140. The headset system 110 is a system environment in which a host (or console) 102 operates. The headset system 110 includes, among other components, a host or host 102 and a headset 105. While FIG. 1 shows a single headset 105, there may be multiple headsets 105 communicating with the host 102.

The headset 105 is a HMD that presents content to a user. The headset 105 includes optics blocks (e.g., an optics block 218 shown in FIG. 2 for each eye of the user) for passing light originating from a display of the headset 105 to an exit pupil of the headset 105. The user of the headset 105, as described herein, is assumed to be a user that needs prescription eyeglasses to correct eye defects such as refractive errors (e.g., myopia, hyperopia, astigmatism, presbyopia, and the like). The properties of the optics blocks 218 such as focal length may be varied in order to correct for a user's eye defects by using the user's eyeglass prescription data, which is referred to herein as eyeglass prescription correction. The headset 105 is described further below in conjunction with FIG. 2.

This disclosure describes eyeglass prescription correction of optics blocks in HMDs without the user having access to the eyeglass prescription data for enhanced security. In one embodiment, the eyeglass prescription data includes a power of the lenses in the optics blocks that represents an amount of correction needed to correct the user's eye defects. For example, the eyeglass prescription data may be represented in diopters (e.g., +1 D or −0.5 D) or as a change in focal length (e.g., 5 mm for a lens with nominal focal length of 50 mm) of the lenses. Eyeglass prescription correction may be implemented in two different methods. In one implementation, the eyeglass prescription correction is implemented using a hardware token approach, where a hardware token is a hardware device (e.g., USD dongle, RFID tag, NFC device) that includes a security token for authentication. The eye doctor provides the eyeglass prescription data to the hardware token, and the hardware token may be directly plugged into the headset 105 or host 102 to store the data in the headset 105 or host 102. The data is used by the headset 105 or host 102 to modify the optics blocks in accordance with the eyeglass prescription data. This implementation is herein referred to as the hardware token correction.

In the other implementation, the eyeglass prescription data is transferred from the eye doctor's office to a server over a data communication network (e.g., server 120). The user provides an identifier (e.g., a number that links to the user's cloud profile) to the eye doctor, and the doctor provides the eyeglass prescription data along with the identifier to an online portal associated with the server 120. When the headset 105 is ready to be used by the user, the headset 105 or the host 102 checks to see if there is an eyeglass prescription for the user, downloads such eyeglass prescription data, and applies it to modify the optics blocks accordingly. This implementation is herein referred to as the cloud-based correction.

The host 102 is a computer directly connected to the headset 105 and provides hosting services to the headset 105. For example, the host 102 renders content and provides the rendered content to the headset 105 for presentation to a user wearing the headset 105. The host 102 may be a VR console 210 described below in conjunction with FIG. 2 or may be a computing system different from the VR console 210.

The server 120 is a server that stores eyeglass prescription data in the cloud-based correction. The server 120 is located outside of the headset system 110. For example, the server 120 is a cloud-based server that is built, hosted, and delivered through a cloud computing platform over network 140 such as Internet. Cloud-based servers possess and exhibit similar capabilities and functionality to a typical server but are accessed remotely from a cloud service provider. The server 120 communicates with other entities of the system 100 via network 140.

The eye doctor computer 130 is a computer such as personal computer, laptop computer, tablet computer, smartphone, and the like, that an eye doctor uses to enter eyeglass prescription data of users to an online portal. An eye doctor as described herein is an eye wear prescriber that provides eyeglass prescription for users with eye defects. Example eye doctors may include optometrists, ophthalmologists, or any other eyewear prescriber. The computer 130 is a client device that accesses a service made available by a server (e.g., server 120). The server is often (but not always) on another computer system, in which case the computer 130 accesses the service by way of the network 140.

The network 140 may comprise any combination of local area and/or wide area networks, using both wired and/or wireless communication systems. In one embodiment, the network 140 uses standard communications technologies and/or protocols. For example, the network 140 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 140 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 140 may be represented using any suitable format, such as hypertext markup language (HTML) or extensible markup language (XML). In some embodiments, all or some of the communication links of the network 140 may be encrypted using any suitable technique or techniques.

In one embodiment, the eyeglass prescription correction is implemented using the hardware token correction. A hardware token is a hardware device (e.g., USB dongle) that includes a security token such as an authentication token or a cryptographic token used in authenticating a user. The hardware token is used to enable the user's eye doctor to provide eyeglass prescription data in a secured fashion without the user having access to the data.

The user may receive the USB dongle along with the headset 105. The user provides the USB dongle to the user's eye doctor for providing eyeglass prescription data. The computer 130 includes pre-installed software that recognizes the hardware and software of the USB dongle such that the eye doctor can use the computer 130 to enter the eyeglass prescription data of the user. The entered eyeglass prescription data is stored within the USB dongle. In some embodiments, the stored eyeglass prescription data is associated with a user identifier that uniquely identifies the user. For example, the user identifier is a number that links to a cloud profile of the user, where the cloud profile is an account created by the user and managed by the server 130. Alternatively, the stored eyeglass prescription data is associated with the user after the data is downloaded by the headset 105 or host 102 as described below.

In one embodiment, the eyeglass prescription data is encoded before being stored such that the data format of the encoded data is compatible with the headset 105 or host 102. For example, the data may be encoded in formats such as ASCII, Unicode, Base64, and the like. In some embodiments, the data is encrypted using a key before being stored to enhance security. The key used for encryption may also be stored in the headset 105 and/or the host 102 such that either the headset 105 or the host 102 may be able to decrypt the encrypted data while applying the eyeglass prescription correction.

In one embodiment, the headset 105 may use a display of a user's smartphone instead of its own display panel (e.g., electronic display 215). In such embodiment, the eyeglass prescription data may be stored in the user's smartphone instead of (or in addition to) at the headset 105 or the host 102. The eye doctor using the computer 130 may provide the eyeglass prescription data directly to the user's smartphone using a wireless (or wired) technique. For example, the data may be transmitted to the smartphone using near field communication by bringing the user's smartphone within the vicinity of the computer 130. Alternatively, the data may be transmitted to the user's smartphone using other wireless techniques such as WiFi, Bluetooth, and the like, or wired techniques such as by plugging in the USB dongle into the computer 130. When the user's smartphone is inserted into the headset 105 to use the smartphone's display for presenting content to the user, the host 102 or the headset 105 obtains the eyeglass prescription data for modifying the optics block 218 from the user's smartphone.

In one embodiment, the eyeglass prescription correction is implemented using the cloud-based correction. The cloud-based correction enhances the security of the eyeglass prescription data as the user does not have access to the data. The cloud-based correction also improves user experience as the host 102 (or the headset 105) automatically checks the cloud-based user profile to see if the user has an eyeglass prescription and modify the optics block 218 accordingly. Each user of the headset 105 has a cloud-based profile that also includes a user identifier that uniquely identifies the user as discussed above in conjunction with the hardware token correction.

When the user visits an eye doctor for receiving an eyeglass prescription, the user provides the user identifier to the eye doctor. After generating the eyeglass prescription data, the eye doctor provides the eyeglass prescription data along with the identifier to an online portal associated with a server over a data communication network (e.g., server 120). In some embodiments, the stored data is encrypted using a cryptographic keys (e.g., digital signatures or biometric data) to enhance security as described above in conjunction with the hardware token correction. When the headset 105 is ready to be used by the user, the headset 105 or the host 102 checks to see if there is an eyeglass prescription for the user, downloads such eyeglass prescription data, and applies it to modify the optics blocks 218 accordingly.

An example eyeglass prescription correction by modifying the optics block 218 of the headset 105 using either the hardware token correction or the cloud-based correction is described below. For example, the optics block 218 is designed to have a focal length of 50 mm and the user of the headset 105 has an eye defect that needs the focal length of the optics block 218 changed to 40 mm instead. In this case, the eyeglass prescription data represents that the focal length of the optics block 218 has to be reduced by 10 mm. When the host 102 applies the eyeglass prescription correction to the optics block 218, the focal length is modified from 50 mm to 40 mm. The focal length of the optics block 218 corresponding to each eye of the user may have different corrections as each eye of the user may need different eyeglass prescription correction. While the optical power of the optics block 218 is referred to herein as a focal length, it might be more appropriate to refer to as a net focal length at least in those embodiments where the optics block 218 is implemented as a combination of multiple optical components (e.g., Alvarez lenses as described below in conjunction with FIG. 2). A system environment of the headset 105 in described below in conjunction with FIG. 2.

VR System Environment

Figure 2:
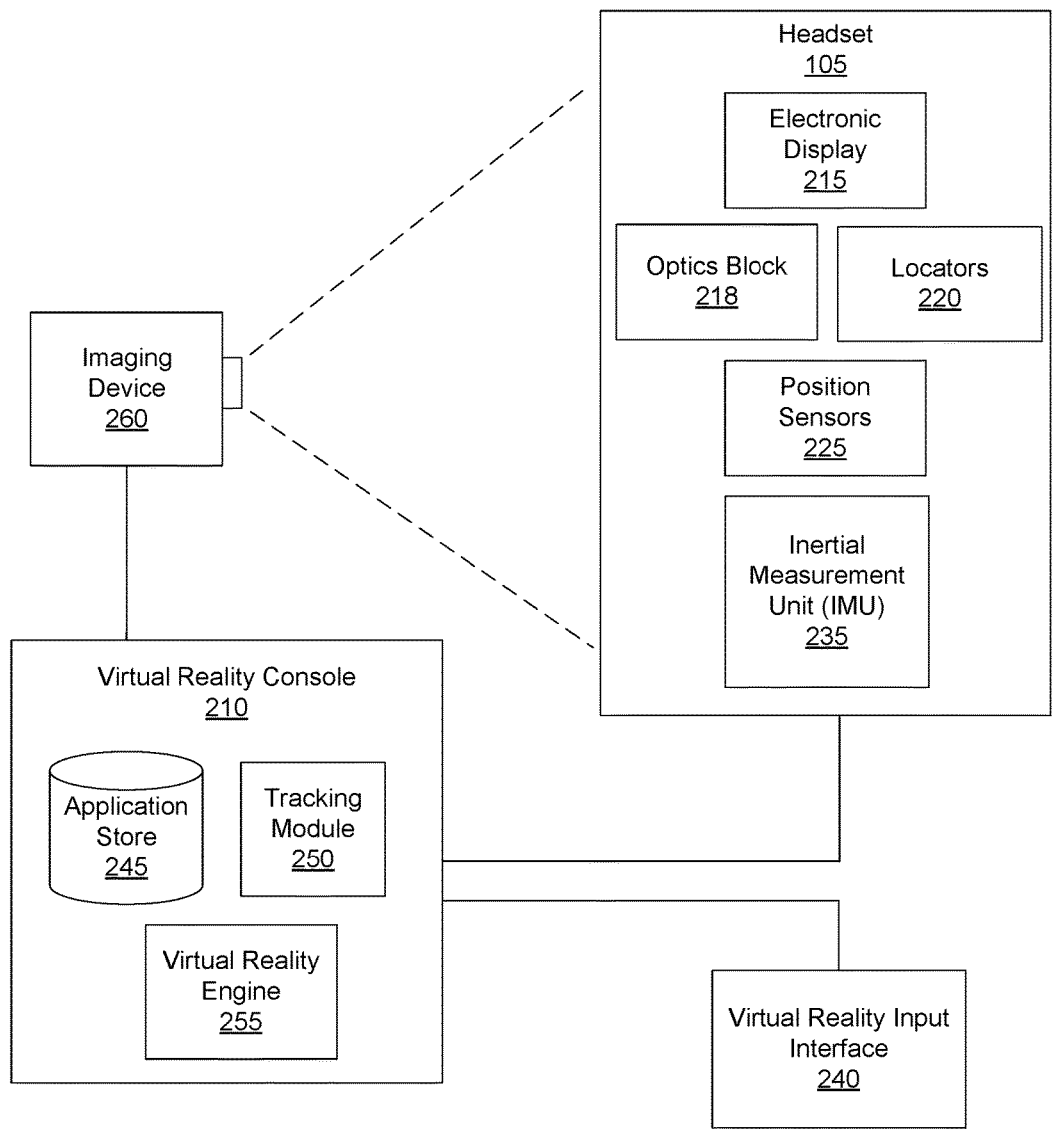
FIG. 2 shows an example VR system, in accordance with at least one embodiment.

FIG. 2 is a VR system environment in which a VR console 210 operates. In this example, the VR system environment includes a headset 105, an imaging device 260, and a VR input interface 240, which are each coupled to a VR console 210. While FIG. 2 shows a single headset 105, a single imaging device 260, and a single VR input interface 240, in other embodiments, any number of these components may be included in the system. For example, there may be multiple headsets 105 each having an associated VR input interface 240 and being monitored by one or more imaging devices 260, with each headset 105, VR input interface 240, and imaging devices 260 communicating with VR console 210. In alternative configurations, different and/or additional components may also be included in the VR system environment. While system environment of FIG. 2 is described in a VR context, the system environment of FIG. 2 may also be part of other HMD systems such as, for example, an AR system environment.

The headset 105 is a HMD that presents content to a user. Example content includes images, video, audio, or some combination thereof. Audio content may be presented via a separate device (e.g., speakers and/or headphones) external to the headset 105 that receives audio information from the headset 105, the VR console 210, or both. The headset 105 includes an electronic display 215, an optics block 218, one or more locators 220, position sensors 225, and an internal measurement unit (IMU) 235. In some embodiments, the headset 105 may act as a VR headset or an AR headset. While the headset 105 is described in FIG. 2 in a VR context as part of a VR system environment, the headset 105 may also be part of other HMD systems such as, for example, an AR system environment. In embodiments that describe AR system environment, the headset 105 augments views of a physical, real-world environment with computer-generated elements (e.g., images, video, sound, etc.). An embodiment of the headset 105 is further described below in conjunction with FIGS. 3A and 3B. The headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The electronic display 215 displays images to the user in accordance with data received from the VR console 210. In various embodiments, the electronic display 215 may comprise a single display panel or multiple display panels (e.g., a display panel for each eye of a user). Examples of the electronic display 215 include: a liquid crystal display (LCD), an organic light emitting diode (OLED) display, an active-matrix organic light-emitting diode display (AMOLED), some other display, or some combination thereof.

The optics block 218 directs light from the electronic display 215 to an exit pupil for viewing by a user using one or more optical elements, such as apertures, Fresnel lenses, convex lenses, concave lenses, filters, and so forth, and may include combinations of different optical elements. In some embodiments, one or more optical elements in the optics block 218 may have one or more coatings, such as anti-reflective coatings. Magnification of the image light by the optics block 218 allows the electronic display 215 to be physically smaller, weigh less, and consume less power than larger displays. Additionally, magnification of the image light may increase a field of view of the displayed content. For example, the field of view of the displayed content is such that the displayed content is presented using almost all (e.g., 110 degrees diagonal), and in some cases, all of the user's field of view.

The optics block 218 may be designed to correct optical error, such as two-dimensional optical errors, three dimensional optical errors, or some combination thereof. Example types of two-dimensional errors include: barrel distortion, pincushion distortion, longitudinal chromatic aberration, transverse chromatic aberration, or any other type of two-dimensional optical error. Three-dimensional errors are optical errors that occur in three dimensions. Example types of three-dimensional errors include spherical aberration, comatic aberration, field curvature, astigmatism, or any other type of three-dimensional optical error. In some embodiments, content provided to the electronic display 215 for display is pre-distorted, and the optics block 218 corrects the distortion when it receives image light from the electronic display 215 generated based on the content.

The optics block 218 may also include tunable optical elements that are designed to correct for eye defects such as refractive errors including but not limited to myopia, hyperopia, astigmatism, and presbyopia. The optics block 218 may be tuned such that its focal length is modified to correct the refractive errors. An example optics block 218 with variable focal lengths may be implemented using a pressurized liquid between two membranes or a liquid crystal lens. The pressure of liquid may be changed using an external input (e.g., an external voltage input), which in turn changes the focal length of the optics block 218.

Alternatively, the optics block 218 may be implemented as Alvarez lens, which is a pair of freeform lenses that change power as the lenses are laterally translated. For example, the Alvarez lens contains two transmissive refractive plates, each having a plano surface and a surface shaped in a two-dimensional cubic profile. The two cubic surfaces are made to be the inverse of each other, so that when both plates are placed with their vertices on the optical axis, the induced phase variations cancel out. However, if the two plates undergo a relative lateral translation, a phase variation is induced that is the differential of the cubic surface profiles, resulting in a quadratic phase profile or, in other words, optical power. Relative movements in the X or Y direction induce cylindrical power independently in orthogonal directions.

In some embodiments, the eye defects may be corrected by moving the position of the electronic display 215 (instead of varying the focal length of the optics block 218) to vary a distance between the electronic display 215 and the optics block 218. For example, if the eyeglass prescription data represents that the focal length of the lens is to be reduced by 2 mm from say 50 mm to 48 mm, the position of the electronic display may be changed (e.g., 2 mm closer or farther to the optics block 218) instead of changing the focal length of the optics block 218. There may be a look-up table that translates the eyeglass prescription data to a change in the position of the electronic display 215.

The optics block 218 may be manufactured with some optical errors. For example, the optics block 218 is designed to have a focal length of 50 mm. Due to manufacturing errors, for example, the optics block 218 of the HMD is manufactured with a focal length of 45 mm. These manufacturing errors are measured at factory soon after the optics block 218 is manufactured. When eyeglass prescription correction, as described above in conjunction with FIG. 1, is implemented for the optics block 218 to increase its focal length from the design value of 50 mm to 60 mm, for example, the correction also takes into account the manufacturing error of −5 mm. An eyeglass prescription correction of 10 mm for eye defect correction and an additional 5 mm for manufacturing correction is applied to the optics block 218 in this example. The manufacturing errors may be corrected along with correcting a user's eye defects during run time while rendering content to the headset 105 as described below in conjunction with FIGS. 4 and 5.

The locators 220 are objects located in specific positions on the headset 105 relative to one another and relative to a specific reference point on the headset 105. Locator 220 may be a light emitting diode (LED), a corner cube reflector, a reflective marker, a type of light source that contrasts with an environment in which the headset 105 operates, or some combination thereof. Active locators 220 (i.e., an LED or other type of light emitting device) may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

The locators 220 can be located beneath an outer surface of the headset 105, which is transparent to the wavelengths of light emitted or reflected by the locators 220 or is thin enough not to substantially attenuate the wavelengths of light emitted or reflected by the locators 220. Further, the outer surface or other portions of the headset 105 can be opaque in the visible band of wavelengths of light. Thus, the locators 220 may emit light in the IR band while under an outer surface of the headset 105 that is transparent in the IR band but opaque in the visible band.

The IMU 235 is an electronic device that generates fast calibration data based on measurement signals received from one or more of the position sensors 225, which generate one or more measurement signals in response to motion of the headset 105. Examples of the position sensors 225 include accelerometers, gyroscopes, magnetometers, other sensors suitable for detecting motion, correcting error associated with the IMU 235, or some combination thereof. The position sensors 225 may be located external to the IMU 235, internal to the IMU 235, or some combination thereof.

Based on the measurement signals from the position sensors 225, the IMU 235 generates fast calibration data indicating an estimated position of the headset 105 relative to an initial position of the headset 105. For example, the position sensors 225 include multiple accelerometers to measure translational motion (forward/back, up/down, left/right) and multiple gyroscopes to measure rotational motion (e.g., pitch, yaw, roll). The IMU 235 can, for example, rapidly sample the measurement signals and calculate the estimated position of headset 105 from the sampled data. For example, the IMU 235 integrates measurement signals received from the accelerometers over time to estimate a velocity vector and integrates the velocity vector over time to determine an estimated position of a reference point on headset 105. The reference point is a point that may be used to describe the position of the headset 105. While the reference point may generally be defined as a point in space, in various embodiments, reference point is defined as a point within the headset 105 (e.g., a center of the IMU 235). Alternatively, the IMU 235 provides the sampled measurement signals to the VR console 210, which determines the fast calibration data.

The IMU 235 can additionally receive one or more calibration parameters from the VR console 210. As further discussed below, the one or more calibration parameters are used to maintain tracking of the headset 105. Based on a received calibration parameter, the IMU 235 may adjust one or more IMU parameters (e.g., sample rate). In some embodiments, certain calibration parameters cause the IMU 235 to update an initial position of the reference point to correspond to a next calibrated position of the reference point. Updating the initial position of the reference point as the next calibrated position of the reference point helps reduce accumulated error associated with determining the estimated position. The accumulated error, also referred to as drift error, causes the estimated position of the reference point to "drift" away from the actual position of the reference point over time.

The imaging device 260 generates slow calibration data in accordance with calibration parameters received from the VR console 210. Slow calibration data includes one or more images showing observed positions of the locators 220 that are detectable by the imaging device 260. The imaging device 260 may include one or more cameras, one or more video cameras, other devices capable of capturing images including one or more locators 220, or some combination thereof. Additionally, the imaging device 260 may include one or more filters (e.g., for increasing signal to noise ratio). The imaging device 260 is configured to detect light emitted or reflected from the locators 220 in a field of view of the imaging device 260. In embodiments where the locators 220 include passive elements (e.g., a retroreflector), the imaging device 260 may include a light source that illuminates some or all of the locators 220, which retro-reflect the light towards the light source in the imaging device 260. Slow calibration data is communicated from the imaging device 260 to the VR console 210, and the imaging device 260 receives one or more calibration parameters from the VR console 210 to adjust one or more imaging parameters (e.g., focal length, focus, frame rate, ISO, sensor temperature, shutter speed, aperture, etc.).

The VR input interface 240 is a device that allows a user to send action requests to the VR console 210. An action request is a request to perform a particular action. For example, an action request may be to start or end an application or to perform a particular action within the application. The VR input interface 240 may include one or more input devices. Example input devices include a keyboard, a mouse, a game controller, or any other suitable device for receiving action requests and communicating the received action requests to the VR console 210. An action request received by the VR input interface 240 is communicated to the VR console 210, which performs an action corresponding to the action request. In some embodiments, the VR input interface 240 may provide haptic feedback to the user in accordance with instructions received from the VR console 210. For example, haptic feedback is provided by the VR input interface 240 when an action request is received, or the VR console 210 communicates instructions to the VR input interface 240 causing the VR input interface 240 to generate haptic feedback when the VR console 210 performs an action.

The VR console 210 provides content to the headset 105 for presentation to the user in accordance with information received from the imaging device 260, the headset 105, or the VR input interface 240. In the example shown in FIG. 2, the VR console 210 includes an application store 245, a tracking module 250, and a VR engine 255. Some embodiments of the VR console 210 have different or additional modules than those described in conjunction with FIG. 2. Similarly, the functions further described below may be distributed among components of the VR console 210 in a different manner than is described here.

The application store 245 stores one or more applications for execution by the VR console 210. An application is a group of instructions, that when executed by a processor, generates content for presentation to the user. Content generated by an application may be in response to inputs received from the user via movement of the headset 105 or the VR interface device 240. Examples of applications include gaming applications, conferencing applications, video playback application, or other suitable applications.

The tracking module 250 calibrates the VR system using one or more calibration parameters and may adjust one or more calibration parameters to reduce error in determining position of the headset 105. For example, the tracking module 250 adjusts the focus of the imaging device 260 to obtain a more accurate position for observed locators 220 on the headset 105. Moreover, calibration performed by the tracking module 250 also accounts for information received from the IMU 235. Additionally, if tracking of the headset 105 is lost (e.g., the imaging device 260 loses line of sight of at least a threshold number of the locators 220), the tracking module 250 re-calibrates some or all of the VR system components.

Additionally, the tracking module 250 tracks the movement of the headset 105 using slow calibration information from the imaging device 260 and determines positions of a reference point on the headset 105 using observed locators from the slow calibration information and a model of the headset 105. The tracking module 250 also determines positions of the reference point on the headset 105 using position information from the fast calibration information from the IMU 235 on headset 105. Additionally, the tracking module 250 may use portions of the fast calibration information, the slow calibration information, or some combination thereof, to predict a future location of the headset 105, which is provided to the VR engine 255.

The VR engine 255 executes applications within the VR system and receives position information, acceleration information, velocity information, predicted future positions, or some combination thereof for the headset 105 from the tracking module 250. Based on the received information, the VR engine 255 determines content to provide to the headset 105 for presentation to the user, such as a virtual scene. For example, if the received information indicates that the user has looked to the left, the VR engine 255 generates content for the headset 105 that mirrors or tracks the user's movement in a virtual environment. Additionally, the VR engine 255 performs an action within an application executing on the VR console 210 in response to an action request received from the VR input interface 240 and provides feedback to the user that the action was performed. The provided feedback may be visual or audible feedback via the headset 105 or haptic feedback via the VR input interface 240.

Figure 3A:
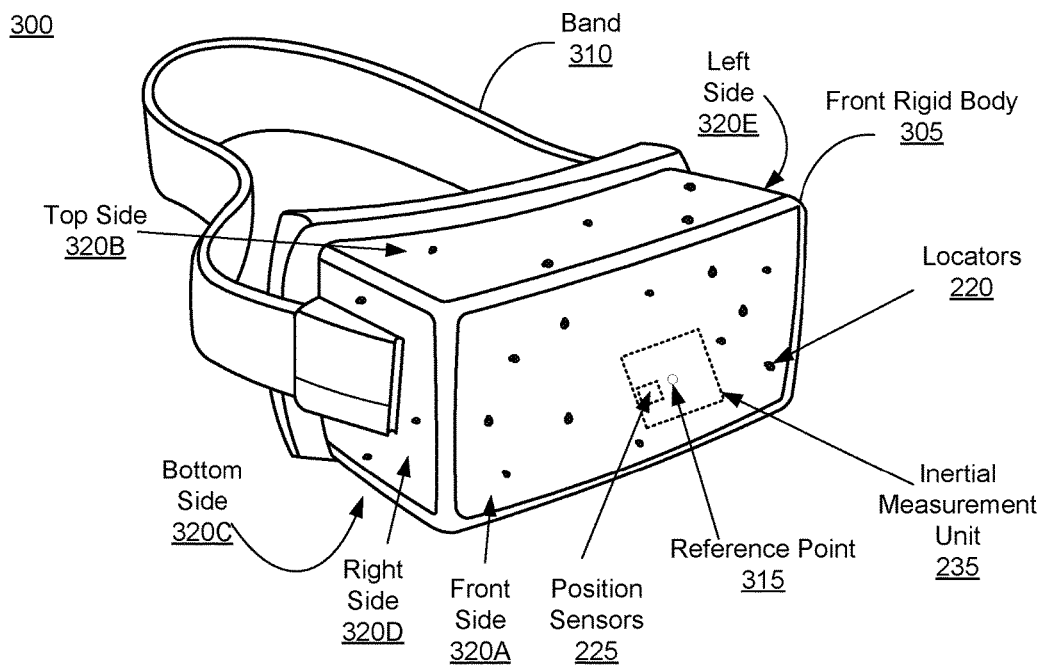
FIG. 3A shows a diagram of a VR headset, in accordance with at least one embodiment.

FIG. 3A is a diagram of VR headset 300, in accordance with at least one embodiment. The VR headset 300 is an embodiment of the headset 105, and includes a front rigid body 305 and a band 310 that goes around a user's head. The front rigid body 305 includes one or more electronic display elements corresponding to the electronic display 215 (not shown in FIG. 3A), the IMU 235, the position sensors 225, and the locators 220. In this example, the position sensors 225 are located within the IMU 235.

The locators 220 are located in fixed positions on the front rigid body 305 relative to one another and relative to the reference point 315. In this example, the reference point 315 is located at the center of the IMU 235. Each of the locators 220 emits light that is detectable by the imaging device 260. The locators 220, or portions of the locators 220, are located on front side 320A, top side 320B, bottom side 320C, right side 320D, and left side 320E of the front rigid body 305, as shown FIG. 3A.

Figure 3B:
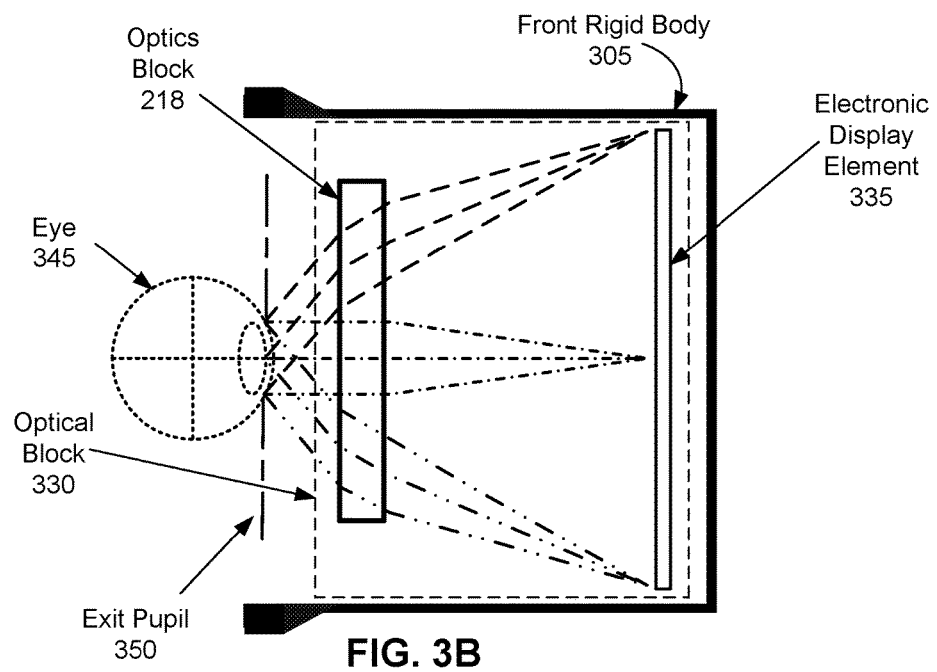
FIG. 3B is a cross section of a front rigid body of the VR headset in FIG. 3A, in accordance with an embodiment.

FIG. 3B is a cross section 325 of the front rigid body 305 of the embodiment of the VR headset 300 shown in FIG. 3A. As shown in FIG. 3B, the front rigid body 305 includes the optical block 330 that provides altered image light to the exit pupil 350. The exit pupil 350 is the location of the front rigid body 305 where the user's eye 345 is positioned. For purposes of illustration, FIG. 3B shows a cross section 325 associated with a single eye 345, but another optical block, separate from the optical block 330, provides altered image light to another eye of the user. The optical block 330 includes the electronic display element 335 of the electronic display 215 and the optics block 218. The electronic display element 335 emits image light toward the optics block 218. The optics block 218 magnifies the image light, and in some embodiments, also corrects for one or more additional optical errors (e.g., distortion, astigmatism, etc.). The optics block 218 directs the image light to the exit pupil 350 for presentation to the user. The optics block 218 may also include tunable optical components such as tunable lenses that tune optical properties such as focal length.

Hardware Token-Based Method for Eyeglass Prescription Correction in HMD Panels

Figure 4:
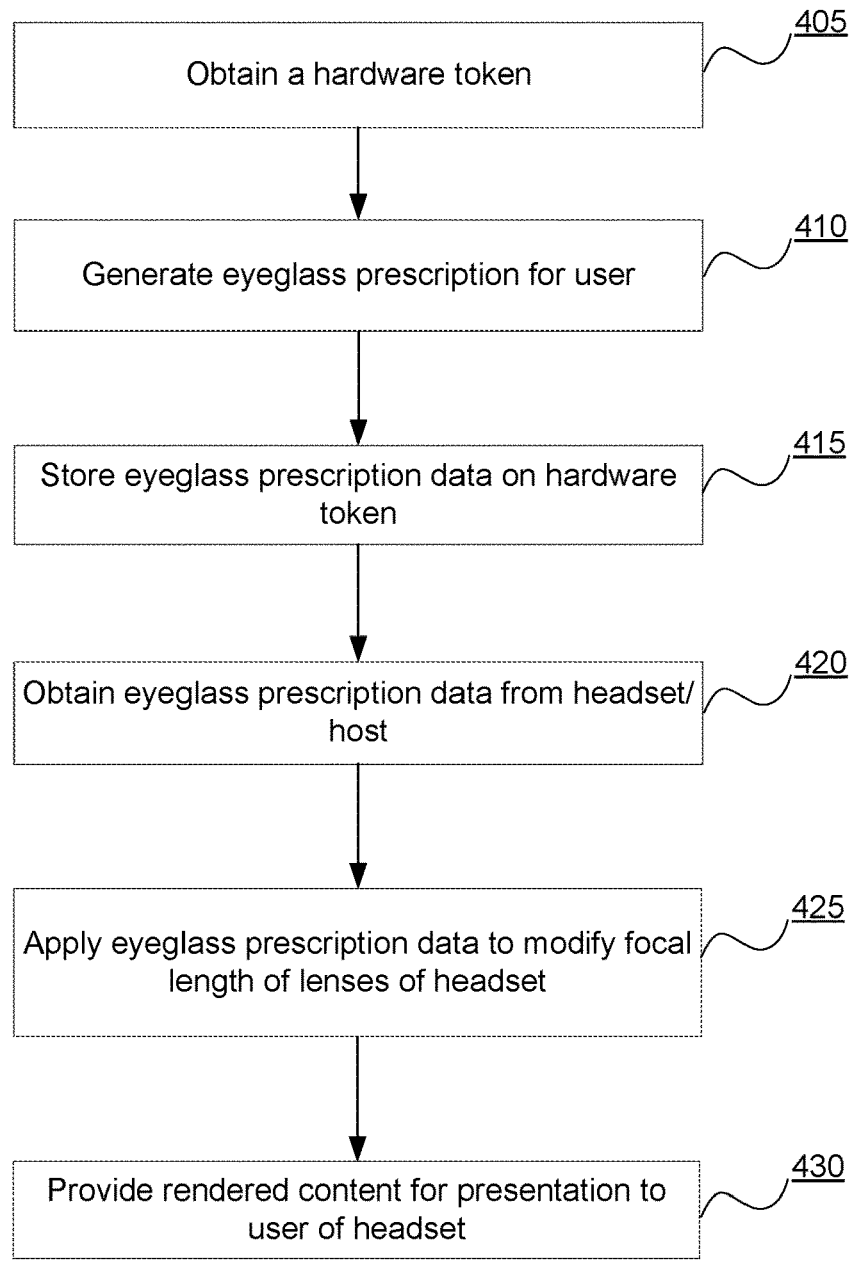
FIG. 4 shows a flowchart of a process for eyeglass prescription correction of optics blocks in HMDs using a hardware token correction, in accordance with an embodiment.

FIG. 4 shows a flowchart of a process 400 for eyeglass prescription correction of optics blocks in HMDs using a hardware token correction, in accordance with an embodiment. In other embodiments, the process 400 may include different and/or additional steps than those shown in FIG. 4. Additionally, the steps of the process 400 may be performed in different orders than the order described in conjunction with FIG. 4 in various embodiments.

In the hardware token correction, a hardware token such as a security token described above in conjunction with FIG. 1 is obtained 405 by a user of the HMD (e.g., headset 105). The user may receive the hardware token along with the headset 105.

When the user visits an eye doctor to get an eyeglass prescription, the user may provide the eye doctor with the hardware token for storing the eyeglass prescription data. The eye doctor performs eye testing on the user to determine the necessary correction for the user's eyes to correct eye defects such as refractive errors. The eye doctor uses eye equipment to generate 410 an appropriate eyeglass prescription for the user. The eye doctor using a computer (e.g., eye doctor computer 130) stores 415 the generated eyeglass prescription data along with the user identifier in the hardware token provided by the user. The hardware token may encrypt the eyeglass prescription data while saving the data to enhance security of the eyeglass prescription data. The encrypted eyeglass prescription data is decrypted by either the host 102 or the headset 105 before being applied to modify the focal length or other optical properties of the optics block 218.

The eyeglass prescription data stored on the hardware token may also be stored at either the host 102 or the headset 105. The eyeglass prescription data stored at the host 102 or the headset 105 is already paired with a user identifier that uniquely describes the user as described above in conjunction with FIG. 1. When the headset 105 booting up sequence is completed, the headset 105 communicates to the host 102 that the headset has completed its booting up sequence. In response to receiving that the booting up sequence is completed, the host 102 obtains 420 the stored eyeglass prescription data for the user either from its own memory or from the headset 105.

The host 102 applies 425 the obtained eyeglass prescription data to modify the focal length of optics blocks 218. The focal length of the optics blocks 218 is modified using the obtained eyeglass prescription data such that the optics block 218 provides corrected vision to the user viewing the content being displayed on the headset 105 as described above in conjunction with FIG. 1.

When the headset 105 requests the host 102 to provide content for presentation to the user, the host 102 renders content to be presented and provides 430 the rendered content for presentation to the user. The headset 105 presents the rendered content for the user's viewing. When the user views the presented content, the user is able to view the content without blurred vision due to refractive errors.

Cloud-Based Method for Eyeglass Prescription Correction in HMD Panels

Figure 5:
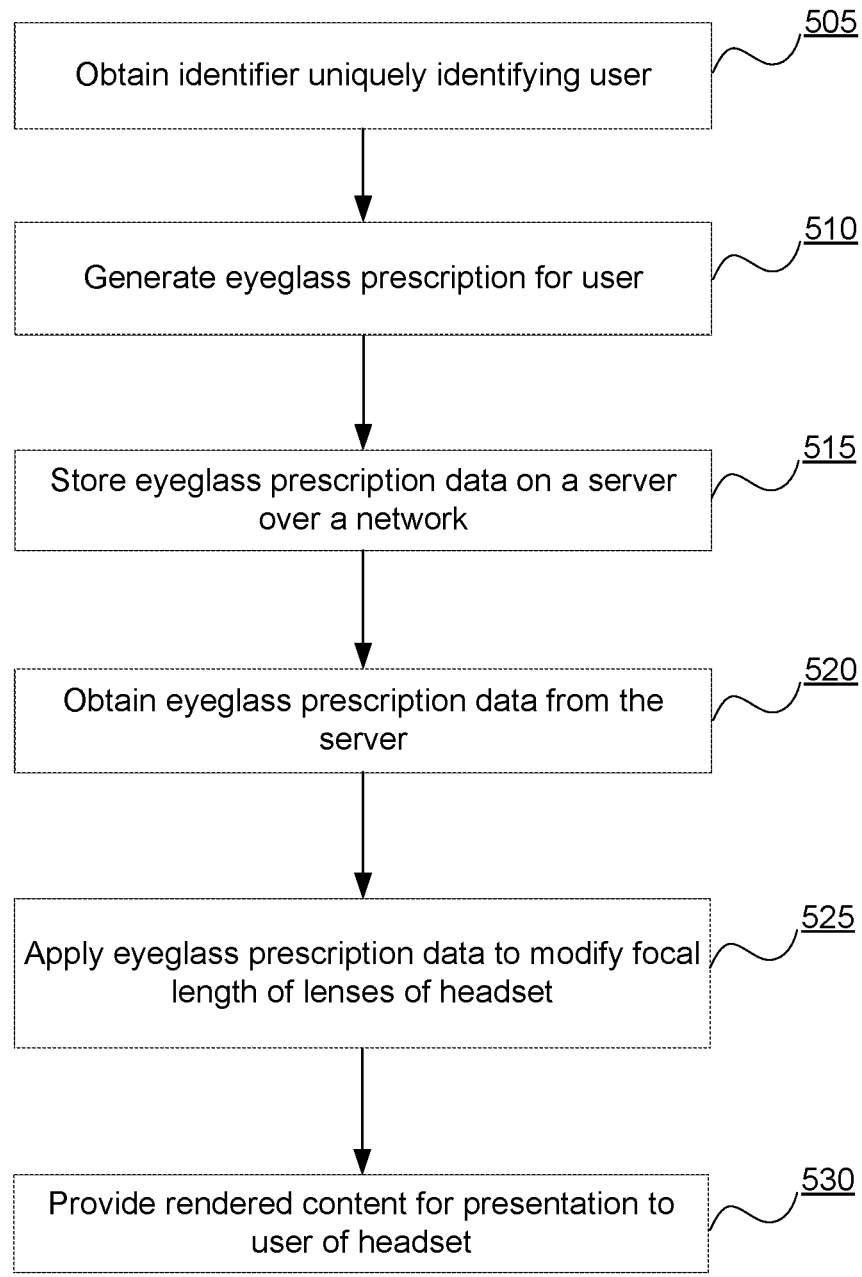
FIG. 5 shows a flowchart of a process for eyeglass prescription correction of optics blocks in HMDs using a cloud-based correction, in accordance with an embodiment.

FIG. 5 shows a flowchart of a process 500 for eyeglass prescription correction of optics blocks in HMDs using a cloud-based correction, in accordance with an embodiment. In other embodiments, the process 500 may include different and/or additional steps than those shown in FIG. 5. Additionally, the steps of the process 500 may be performed in different orders than the order described in conjunction with FIG. 5 in various embodiments.

In the cloud-based correction, a user of a HMD (e.g., headset 105) creates an account that is managed by a cloud-based system (e.g., a system of server 120). The created account of the user includes an identifier that uniquely identifies the user.

When the user visits an eye doctor to get an eyeglass prescription, the eye doctor obtains 505 the user identifier from the user. The eye doctor performs eye testing on the user to determine the necessary correction for the user's eyes and uses eye equipment to generate 510 an appropriate eyeglass prescription for the user.

The eye doctor using a computer (e.g., eye doctor computer 130) enters the generated eyeglass prescription data along with the user identifier into an online portal. The online portal is managed and hosted by a cloud-based server (e.g., server 120) such that the entered eyeglass prescription data is stored 515 at the server 120.

When a booting up sequence of the headset 105 is initiated, the headset 105 notifies the host 102. In response to receiving the initiation notification, the host 102 transmits a request to the server 120 for the eyeglass prescription data of the user along with the user identifier. In some embodiments, the host 102 transmits the request to the server 120 after the host 102 receives a notification that the headset 105 has completed its booting up sequence. In response to transmitting the request, the server 120 provides and the host 102 obtains 520 the eyeglass prescription data for the user from the server 120.

The host 102 applies 525 the obtained eyeglass prescription data to modify the focal length or other optical properties of optics blocks 218. The focal length of the optics blocks 218 is modified using the obtained eyeglass prescription data such that the user's eye can properly view the content being displayed on the headset 105 as described above in conjunction with FIG. 1.

When the headset 105 requests the host 102 to provide content for presentation to the user, the host 102 renders content to be presented and provides 530 the rendered content for presentation to the user as describe above in conjunction with FIG. 4. The headset 105 presents the rendered content for the user's viewing. When the user views the presented content, the user is able to view the content without blurred vision due to refractive errors.

Performing eyeglass prescription correction for optics blocks in HMDs using either the hardware token correction or the cloud-based correction offers several advantages. For example, modifying the HMD optics blocks using eyeglass prescription increases user convenience without reducing user experience by eliminating the need for the user to wear prescription eyeglasses (or contact lenses) while viewing content on HMDs. Additionally, modifying the HMD optics blocks without the user having access to the eyeglass prescription data enhances security of personal data such as eyeglass prescription data.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

What is claimed is:

1. A computer-implemented method for modifying an optical component of a head-mounted display (HMD), the method comprising:
    receiving, at a first server, an identifier uniquely identifying a user of the HMD;
    obtaining, at the first server, an eyeglass prescription data corresponding to the unique identifier, the eyeglass prescription data comprising data for correcting eye defects of the user associated with the identifier, wherein the eyeglass prescription data is encrypted using a cryptographic key including at least one among a digital signature and biometric data before the first server obtains the eyeglass prescription data;
    decrypting, at the first server, the obtained eyeglass prescription data; and
    applying, by the first server, the decrypted eyeglass prescription data to modify an optical property of the optical component of the HMD, the modified optical component providing corrected vision to the user while viewing content displayed on the HMD, wherein the optical component of the HMD is a tunable lens, wherein the tunable lens is at least one among a pressurized liquid between two membranes, a liquid crystal lens, and an Alvarez lens.

2. The method of claim 1, wherein the eyeglass prescription data is obtained from a second server over a data communication network, the second server being remote to a system of the HMD and to the first server providing hosting services to the HMD.

3. The method of claim 1, wherein the eyeglass prescription data is obtained from the HMD.

4. The method of claim 3, wherein the eyeglass prescription data is stored in the HMD, the stored data provided to the HMD using a hardware token.

5. The method of claim 4, wherein the eyeglass prescription data is stored in the HMD by pairing the eyeglass prescription data with the identifier.

6. The method of claim 1, wherein the eyeglass prescription data is stored in a user's mobile phone, the eyeglass prescription data is obtained from the mobile phone when a display of the user's mobile phone is used for displaying content in the HMD.

7. The method of claim 6, wherein the eyeglass prescription data stored in the user's mobile phone is received from a computer associated with an eye doctor of the user.

8. The method of claim 1, wherein the eyeglass prescription data comprises a power for the optical component of the HMD for correcting the eye defects of one or more user's eyes, the eye defects comprising at least one of: myopia, hyperopia, astigmatism, and presbyopia.

9. The method of claim 1, wherein modifying the optical property of the optical component further comprises varying the optical property to correct for manufacturing variation of the optical component.

10. The method of claim 1, wherein the optical property is a focal length of the tunable lens.

11. An apparatus comprising:
    a processor; and
    a non-transitory computer-readable storage medium storing executable computer program instructions for modifying an optical component of a head-mounted display (HMD), the instructions executable by the processor and causing the processor to perform a method comprising:
    receiving, at a first server, an identifier uniquely identifying a user of the HMD;
    obtaining, at the first server, an eyeglass prescription data corresponding to the unique identifier, the eyeglass prescription data comprising data for correcting eye defects of the user associated with the identifier, wherein the eyeglass prescription data is encrypted using a cryptographic key including at least one among a digital signature and biometric data before the first server obtains the eyeglass prescription data;
    decrypting, at the first server, the obtained eyeglass prescription data; and
    applying, by the first server, the decrypted eyeglass prescription data to modify an optical property of the optical component of the HMD, the modified optical component providing corrected vision to the user while viewing content displayed on the HMD, wherein the optical component of the HMD is a tunable lens, wherein the tunable lens is at least one among a pressurized liquid between two membranes, a liquid crystal lens, and an Alvarez lens.

12. The apparatus of claim 11, wherein the eyeglass prescription data is obtained from a second server over a data communication network, the second server being remote to a system of the HMD and to the first server providing hosting services to the HMD.

13. The apparatus of claim 11, wherein the eyeglass prescription data is obtained from the HMD, the eyeglass prescription data is provided to the HMD using a hardware token and stored in the HMD.

14. The apparatus of claim 13, wherein the eyeglass prescription data is stored in the HMD by pairing the eyeglass prescription data with the identifier.

15. The apparatus of claim 11, wherein the eyeglass prescription data is stored in a user's mobile phone, the eyeglass prescription data is obtained from the mobile phone when a display of the user's mobile phone is used for displaying content in the HMD.

16. The apparatus of claim 15, wherein the eyeglass prescription data stored in the user's mobile phone is received from a computer associated with an eye doctor of the user.

17. The apparatus of claim 11, wherein the eyeglass prescription data comprises a power for the optical component of the HMD for correcting the eye defects of one or more user's eyes, the eye defects comprising at least one of: myopia, hyperopia, astigmatism, and presbyopia.

18. The apparatus of claim 11, wherein the optical property is a focal length of the tunable lens.

19. A computer program product comprising a non-transitory computer-readable storage medium storing executable computer program instructions for modifying an optical component of a head-mounted display (HMD), the instructions executable by a processor and causing the processor to perform a method comprising:
    receiving, at a first server, an identifier uniquely identifying a user of the HMD;
    obtaining, at the first server, an eyeglass prescription data corresponding to the unique identifier, the eyeglass prescription data comprising data for correcting eye defects of the user associated with the identifier, wherein the eyeglass prescription data is encrypted using a cryptographic key including at least one among a digital signature and biometric data before the first server obtains the eyeglass prescription data;

decrypting, at the first server, the obtained eyeglass prescription data; and applying, by the first server, the decrypted eyeglass prescription data to modify an optical property of the optical component of the HMD, the modified optical component provide corrected vision to the user while viewing content displayed on the HMD, wherein the optical component of the HMD is a tunable lens, wherein the tunable lens is at least one among a pressurized liquid between two membranes, a liquid crystal lens, and an Alvarez lens.

* * * * *